United States Patent
Sakanobe et al.

(10) Patent No.: US 8,944,777 B2
(45) Date of Patent: Feb. 3, 2015

(54) AIR-CONDITIONING APPARATUS

(75) Inventors: Kazunori Sakanobe, Tokyo (JP);
Kazunori Hatakeyama, Tokyo (JP);
Shinya Matsushita, Tokyo (JP);
Shinsaku Kusube, Tokyo (JP);
Tsutomu Makino, Aichi (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 543 days.

(21) Appl. No.: 13/379,439

(22) PCT Filed: Apr. 20, 2010

(86) PCT No.: PCT/JP2010/002827
§ 371 (c)(1),
(2), (4) Date: Dec. 20, 2011

(87) PCT Pub. No.: WO2011/013277
PCT Pub. Date: Feb. 3, 2011

(65) Prior Publication Data
US 2012/0096881 A1    Apr. 26, 2012

(30) Foreign Application Priority Data

Jul. 27, 2009  (JP) .................................. 2009-174263

(51) Int. Cl.
*F25B 49/02* (2006.01)

(52) U.S. Cl.
CPC ........... *F25B 49/025* (2013.01); *F25B 2500/13* (2013.01); *F25B 2500/26* (2013.01); *F25B 2600/021* (2013.01); *Y02B 30/741* (2013.01)
USPC ............ 417/44.1; 417/45; 417/53; 417/410.1

(58) Field of Classification Search
CPC ............... F25B 49/025; F25B 2500/26; F25B 2600/21; F25B 2500/13; Y02B 30/741
USPC .............. 417/44.1, 44.11, 45, 53, 410.1, 411; 318/293
See application file for complete search history.

(56) References Cited

U.S. PATENT DOCUMENTS 2,479,329 A * 8/1949 Ellis ........................ 310/216.095
4,758,938 A * 7/1988 Kanazawa ....................... 363/41
(Continued)

FOREIGN PATENT DOCUMENTS

JP    60-68341 U    5/1985
JP    61-91445 A    5/1986
(Continued)

OTHER PUBLICATIONS

Office Action (Notification of the First Office Action) issued Jul. 26, 2013, by the Chinese Patent Office in corresponding Chinese Patent Application No. 201080028929.5, and an English Translation of the Office Action. (12 pages).
(Continued)

*Primary Examiner* — Peter J Bertheaud
*Assistant Examiner* — Dominick L Plakkoottam
(74) *Attorney, Agent, or Firm* — Buchanan Ingersoll & Rooney PC

(57) ABSTRACT

The air-conditioning apparatus includes a coolant circuit configured by sequentially connecting a compressor, an indoor heat exchanger, an expansion valve, and an outdoor heat exchanger; a motor that operates a compressor mechanism disposed inside the compressor; an inverter for driving the motor; and a control unit that controls the inverter. The control unit includes a liquefaction detecting unit that detects coolant liquefaction in the compressor; includes a first PWM signal generating unit that generates an inverter control signal for driving the motor; includes a second PWM signal generating unit that generates an inverter control signal for making the motor perform a preheating operation; and includes a switching unit that performs switching in such a way that the first PWM signal generating unit or the second PWM signal generating unit outputs the corresponding inverter control signal to the inverter.

11 Claims, 6 Drawing Sheets

(56) References Cited

U.S. PATENT DOCUMENTS

| | | |
|---|---|---|
| 2004/0108824 A1 | 6/2004 | Ueda et al. |
| 2008/0018190 A1 | 1/2008 | Takahata et al. |
| 2008/0123373 A1* | 5/2008 | Roesner et al. ............... 363/65 |
| 2009/0160384 A1* | 6/2009 | Mullin et al. ............ 318/400.34 |
| 2010/0166575 A1 | 7/2010 | Fukuda et al. |
| 2010/0232983 A1* | 9/2010 | Maeda et al. .................... 417/53 |

FOREIGN PATENT DOCUMENTS

| | | | |
|---|---|---|---|
| JP | 62-112959 A | 5/1987 | |
| JP | 8-226714 A | 9/1996 | |
| JP | 08226714 A * | 9/1996 | ............... F25B 1/00 |
| JP | 2004-56994 A | 2/2004 | |
| JP | 2007-295676 A | 11/2007 | |
| JP | 2008-29095 A | 2/2008 | |
| JP | 2008-61412 A | 3/2008 | |
| WO | WO 2008/084775 A1 | 7/2008 | |

OTHER PUBLICATIONS

International Search Report (PCT/ISA/210) issued on Jun. 29, 2010, by Japanese Patent Office as the International Searching Authority for International Application No. PCT/JP2010/002827.

Written Opinion (PCT/ISA/237) issued on Jun. 29, 2010, by Japanese Patent Office as the International Searching Authority for International Application No. PCT/JP2010/002827.

* cited by examiner (a) ASYNCHRONOUS PWM (b) SYNCHRONOUS PWM

END OF WINDING
COOLANT IMPEDANCE
COMPRESSOR FRAME (a)     (b)

AIR-CONDITIONING APPARATUS

FIELD

The present invention relates to an air-conditioning apparatus equipped with a compressor and particularly relates to preheating of a liquid coolant at the time of starting the operation.

BACKGROUND

Generally, in an air-conditioning apparatus in which an indoor heat exchanger and an outdoor heat exchanger are connected to a compressor via coolant piping, when the compressor stops operating, the coolant has a tendency to move toward the coolest portion in the refrigeration cycle and to get condensed.

For example, when the operation of an air heater is stopped during nighttime, the coolant in the indoor heat exchanger moves to the compressor or to the outdoor heat exchanger, because the compressor or the outdoor heat exchanger are at a lower temperature as compared to the indoor heat exchanger. As the outside air temperature rises in the morning, the outdoor heat exchanger undergoes a faster rise in temperature because of its smaller heat capacity than the heat capacity of the compressor. Hence, the coolant inside the outdoor heat exchanger moves toward the compressor having a lower temperature and gets condensed. That leads to the occurrence of a phenomenon in which the coolant goes on dissolving in the oil that is present in an oil reservoir space provided inside an airtight vessel of the compressor.

Such a phenomenon is called a coolant liquefaction phenomenon. As a result of the coolant liquefaction phenomenon, the liquid coolant dilutes the oil present in the oil reservoir. Moreover, at the time of restarting the compressor; the coolant, which has dissolved in the oil present in the oil reservoir, elutes in the form of bubbles thereby leading to a foaming phenomenon. Or else, if the compression element directly absorbs the liquid coolant, then that may result in liquid compression thereby causing malfunctioning of the compressor.

In a typical air-conditioning apparatus, with the aim of avoiding malfunctioning of the compressor caused by the coolant liquefaction phenomenon; a signal is output when the quantity of the liquid coolant accumulated inside the compressor becomes equal to or greater than a predetermined quantity, and a control unit that receives the output signal passes a high-frequency open-phase current of low intensity to a motor winding so that the motor winding is warmed. With that, a situation is prevented from occurring in which liquid compression is caused due to the start of operation in a state when the liquid coolant inside the compressor is accumulated at a low temperature. As a result, the compressor is prevented from falling into disrepair (for example, see Patent Literature 1).

CITATION LIST

Patent Literature

Patent Literature 1: Japanese Patent Application Laid-open No. H8-226714 (page 5, FIG. 1)

SUMMARY

Technical Problem

However, generally, as a means for performing variable speed control of the compressor, an inverter having asynchronous PWM is put to use. In that case, due to the interference between an output voltage frequency fo and a PWM carrier frequency fc, a differential component frequency m·fo±n·fc (m and n are integers) is generated. If the differential component appears in a low-frequency region, then that causes vibrations of bearings or noise in the compressor motor.

During the normal operation, the noise or the vibrations occurring due to the differential component are not prominent because the motor is rotating. However, during a preheating operation, the current is passed under the condition that the motor is not run. Consequently, the noise or the vibrations caused by the differential component frequency become prominent. That leads to degradation of the product or the performance.

The present invention has been made in view of the above-mentioned problems in the conventional technology and it is an object of the present invention to provide an air-conditioning apparatus in which the coolant can be preheated without causing vibrations or noise.

Solution to Problem

In order to solve above-mentioned problems and achieve the object, an air-conditioning apparatus according to an aspect of the present invention includes a coolant circuit configured by sequentially connecting a compressor, an indoor heat exchanger, an expansion valve, and an outdoor heat exchanger; a motor that operates a compressor mechanism disposed inside the compressor; an inverter for driving the motor; and a control unit that controls the inverter, wherein the control unit includes a liquefaction detecting unit that detects coolant liquefaction in the compressor; a first PWM signal generating unit that generates an inverter control signal for driving the motor; a second PWM signal generating unit that generates an inverter control signal for making the motor perform a preheating operation; and a switching unit that performs switching in such a way that either one of the first PWM signal generating unit or the second PWM signal generating unit outputs a corresponding inverter control signal to the inverter.

Advantageous Effects of Invention

According to an aspect of the present invention, it is possible to provide an air-conditioning apparatus in which the coolant can be preheated without causing vibrations or noise.

REFERENCE SIGNS LIST

1 COMPRESSOR
2 FOUR-WAY VALVE
3 OUTDOOR HEAT EXCHANGER
4 EXPANSION VALVE
5 INDOOR HEAT EXCHANGER
6 PWM INVERTER
7 CONTROL UNIT
8 COOLANT PIPING
11 COMPRESSOR MECHANISM
12 MOTOR
71 SWITCHING UNIT
72 FIRST PWM SIGNAL GENERATING UNIT
73 SECOND PWM SIGNAL GENERATING UNIT
74 LIQUEFACTION DETECTING UNIT
121 IRON CORE
122 MAGNET

DESCRIPTION OF EMBODIMENTS

First Embodiment.

Figure 1:
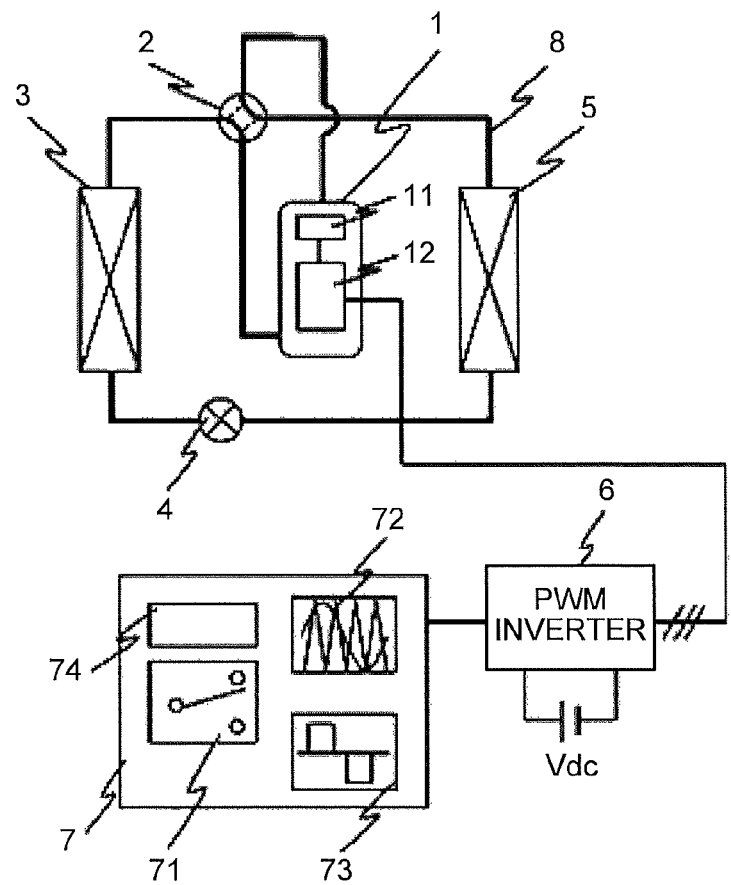
FIG. 1 is a configuration diagram of an air-conditioning apparatus according to a first embodiment.

FIG. 1 is a configuration diagram of an air-conditioning apparatus according to a first embodiment.

In FIG. 1, the reference numeral 1 represents a compressor, the reference numeral 2 represents a four-way valve, the reference numeral 3 represents an outdoor heat exchanger, the reference numeral 4 represents an expansion valve, and the reference numeral 5 represents an indoor heat exchanger. These constituent elements are installed so as to circulate a coolant via a coolant piping 8.

Inside the compressor 1, a compression mechanism 11 is disposed for compressing the coolant and a motor 12 is disposed for operating the compression mechanism 11. Meanwhile, the reference numeral 6 represents a PWM inverter, which is electrically-connected to the motor 12 and which supplies voltage to the motor 12. The reference numeral 7 represents a control unit, which is electrically-connected to the PWM inverter 6 and which outputs a signal for controlling the PWM inverter.

In the control unit 7 are disposed a liquefaction detecting unit 74 for detecting liquefaction of the coolant inside the compressor 1, a first PWM signal generating unit 72 for generating an inverter control signal that causes the motor 12 to rotate, and a second PWM signal generating unit 73 for generating an inverter control signal that makes the motor 12 perform a preheating operation. Meanwhile, the reference numeral 71 represents a switching unit that selectively switches between the first PWM signal generating unit 72 and the second PWM signal generating unit 73, so that the selected inverter control signal is output as the output signal of the control unit 7 to the PWM inverter 6.

Explained below is a signal generating method performed by each PWM signal generating unit.

Figure 2:
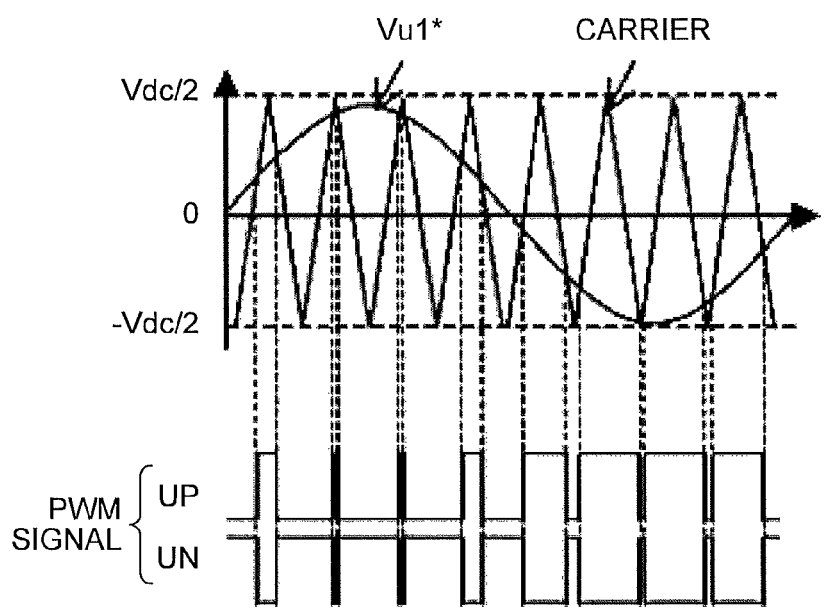
FIG. 2 is a diagram illustrating a signal generating method for a single phase as performed by a first PWM signal generating unit according to the first embodiment.

FIG. 2 is a diagram illustrating a signal generating method for a single phase as performed by the first PWM signal generating unit 72. The signal generating method illustrated in FIG. 2 corresponds to a technique generally referred to as asynchronous PWM. A voltage command signal Vu1* is compared with a carrier signal having an amplitude Vdc/2 (where, Vdc represents a direct-current bus voltage of the PWM inverter) at a predetermined frequency; and, based on the magnitude relation therebetween, PWM signals UP and UN are generated.

Thus, if the carrier signal has greater amplitude than the voltage command signal Vu1*, the UP is switched ON and the UN is switched OFF. When that is not the case, the UP is switched OFF and the UN is switched ON. Herein, the UP represents a control signal added to a switching element of an upper arm of the inverter; and the UN represents a control signal added to a switching element of a lower arm of the inverter.

Figure 3:
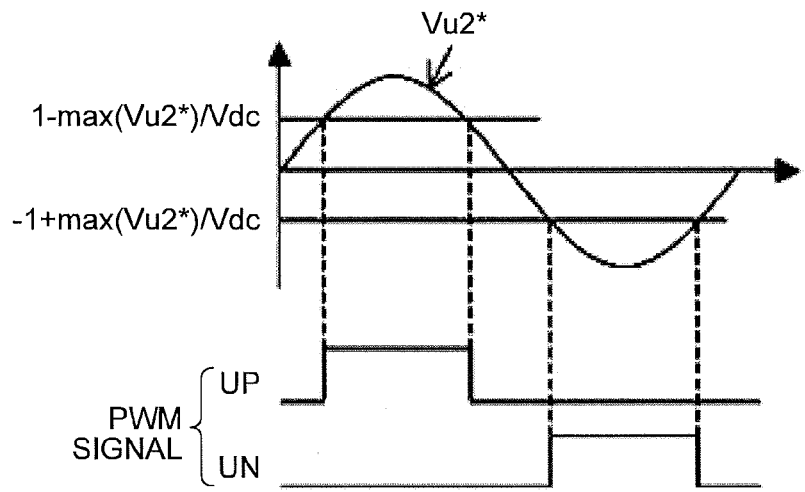
FIG. 3 is a diagram illustrating a signal generating method for a single phase as performed by a second PWM signal generating unit according to the first embodiment.

FIG. 3 is a diagram illustrating a signal generating method for a single phase as performed by the second PWM signal generating unit 73. The signal generating method illustrated in FIG. 3 corresponds to one of the techniques that are referred to as synchronous PWM. A voltage command signal Vu2* is compared with a predetermined level that corresponds to the modulation factor of the voltage command (in FIG. 3, stated as 1−max(Vu2*)/Vdc, wherein max represents a function for the maximum value of the signal); and, based on the magnitude relation therebetween, the PWM signals UP and UN are generated.

Thus, when the voltage command signal Vu2* is greater than a predetermined level of positive voltage, the UP is switched ON; and when the voltage command signal Vu2* is smaller than the predetermined level of positive voltage, the UP is switched OFF. Moreover, when the voltage command signal Vu2* is smaller than a predetermined level of negative voltage, the UN is switched ON; and when the voltage command signal Vu2* is greater than a predetermined level of negative voltage, the UN is switched OFF.

Figure 4:
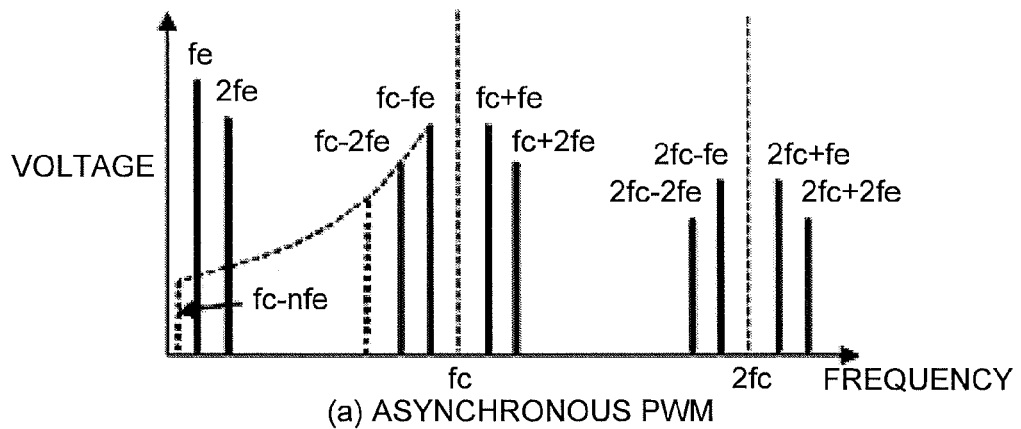
FIG. 4 is a diagram illustrating a frequency spectrum of an asynchronous PWM and a frequency spectrum of a synchronous PWM according to the first embodiment.
Figure 4:
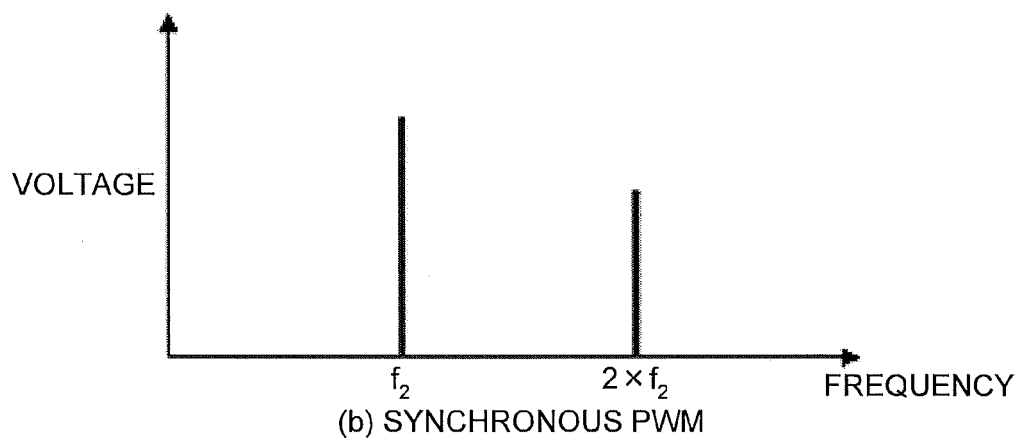

Explained below with reference to FIG. 4 are output frequency components of the abovementioned two PWM methods (asynchronous PWM and synchronous PWM).

FIG. 4(a) is a diagram illustrating a frequency spectrum of the asynchronous PWM and FIG. 4(b) is a diagram illustrating a frequency spectrum of the synchronous PWM. The asynchronous PWM represents a synthetic wave of the carrier frequency fc and the output frequency fe. However, generally, since the carrier frequency fc as well as the output frequency fe include a harmonic component, a side band gets generated thereby leading to the diffusion of spectrum over a wide frequency range including low-frequencies.

On the other hand, as the characteristic of the synchronous PWM, a PWM signal is output according to the magnitude comparison with a predetermined voltage level; and, since the carrier frequency is equivalent to being 0, only the output frequency (in FIG. 4(b), illustrated as f2) and the harmonic component thereof are generated and it is ensured that spectrum diffusion does not occur at low-frequencies than f2.

Given below is the explanation of operations.

In the control unit 7 configured in the above-mentioned manner, during the period when operation of the compressor is stopped, the liquefaction detecting unit 74 refers to the information on the temperature of the refrigeration cycle and the elapsed time, detects liquefaction of the coolant, and outputs compressor liquefaction detection information to the switching unit 71.

Subsequently, the switching unit 71 switches the PWM signal generating method to that of the second PWM signal generating unit 73, and generates a PWM signal for preheating.

In the second PWM signal generating unit, with the frequency f2 of the voltage command Vu2* considered as a sufficiently higher frequency than the operating range of the compressor, a voltage command is generated using the synchronous PWM. Thus, although fe is usually about 400 Hz, the PWM signal is generated with the voltage command frequency f2 that is equal to or greater than about few kHz. Moreover, the PWM inverter convers that PWM signal into a voltage and applies that voltage to the motor 12.

In the stator winding of the motor 12 flows a high-frequency electric current not including low-frequency components. Hence, it becomes possible to heat the iron core without causing rotary torque or vibrations. Because of the heating of the motor, the liquid coolant accumulated inside the compressor 1 heats up, evaporates, and leaks to the outside of the compressor.

Meanwhile, the electric current can be passed either in a single phase or in two phases. Rather, as long as the control is performed to not generate the rotating magnetic field, the electric current can also be passed in all three phases.

The liquefaction detecting unit 74 evaluates the coolant leakage occurring for a predetermined time, ends heating of the motor when it is determined that the liquefaction condition has returned to the normal condition.

Meanwhile, as an example of the detection method employed by the liquefaction detecting unit 74, liquefaction is determined to have occurred if a condition in which the temperature of the outdoor machine is equal to or lower than a predetermined temperature goes on for a predetermined time period.

When a compressor operation command is received from outside, the switching unit 71 can switch to the first PWM signal generating unit so that the asynchronous PWM is generated corresponding to the voltage/frequency used for operating the compressor in variable speed, and the compressor is operated accordingly. With that, apart from the determination performed by the liquefaction detecting unit 74, the compressor can also be operated manually.

Moreover, if the voltage command frequency f2 is set to be a high frequency, the then vibrating sound of the iron core of the motor falls out of the audibility range thereby enabling achieving further reduction in the noise.

Figure 5:
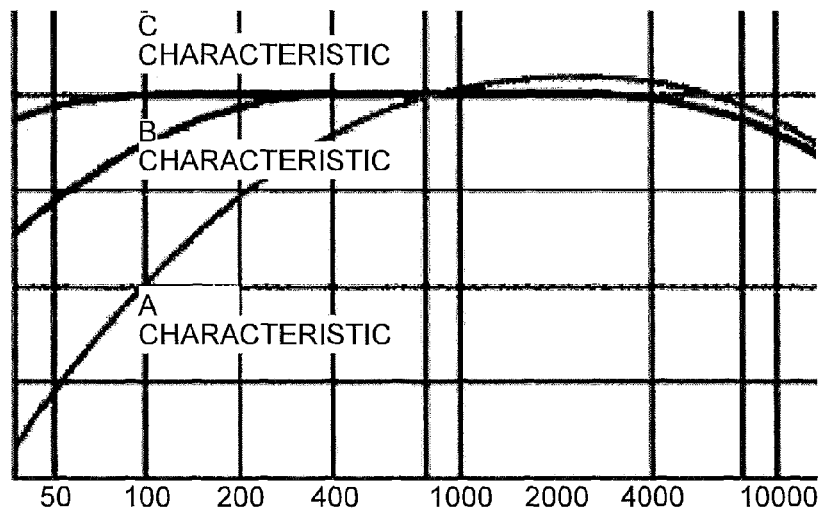
FIG. 5 is a diagram illustrating frequency weighting curves for the human ear.

FIG. 5 is a diagram illustrating frequency weighting curves for the human ear. Herein, it can be seen that the response that represents frequency weighting undergoes significant decline from around 10 kHz of the high frequencies. For that reason, by setting the voltage command frequency f2 to equal to or greater than 10 kHz, it becomes possible to further achieve the noise reduction effect.

When a voltage is applied to the stator winding of the motor 12, heating thereof occurs due to two types of loss, namely, copper loss and iron loss. However, in the case of a concentrated winding motor having a small coil end and having a low resistance, only a small amount of heat is generated due to copper loss. As a result, by the usual method, heating cannot be performed in an efficient manner. In contrast, according to the first embodiment, since heat generation with copper loss is made possible by means of high-frequency heating, the heating can be performed more efficiently.

Figure 6:
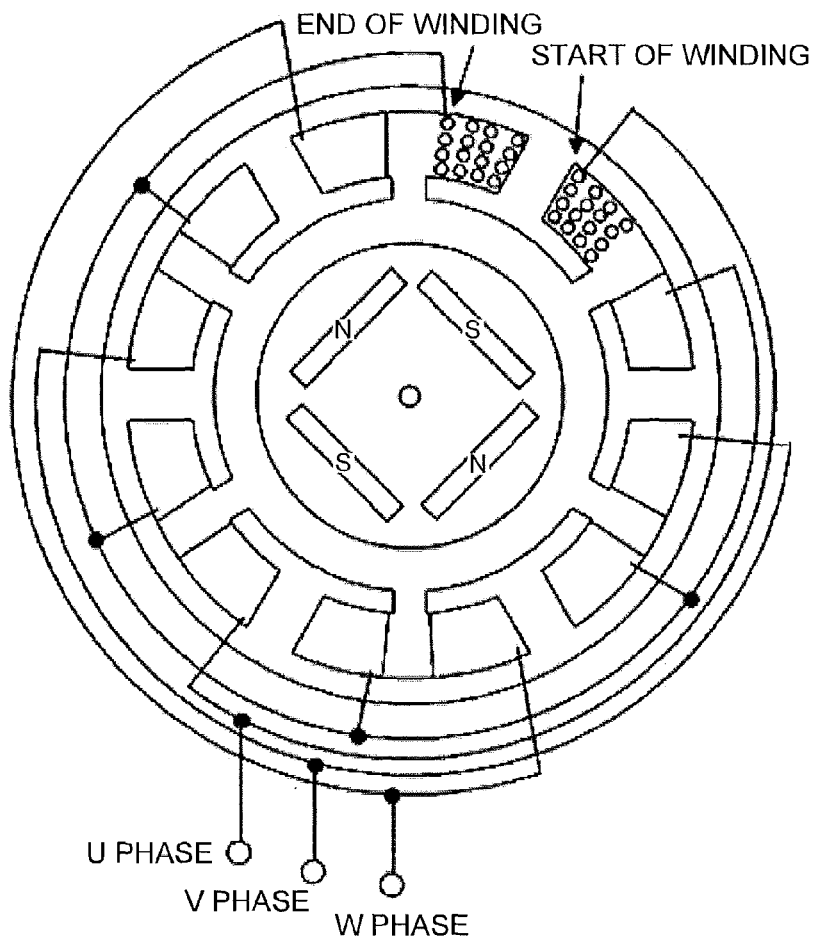
FIG. 6 is a diagram illustrating an example of the manner of winding a stator winding.

Meanwhile, in the case of concentrated winding, the desirable manner of winding the stator winding is to consider the phase terminal side of the motor as the starting point for winding and consider the neutral point side as the end point for winding. In FIG. 6 is illustrated an example of the manner of winding the stator winding according to the first embodiment.

Figure 7:
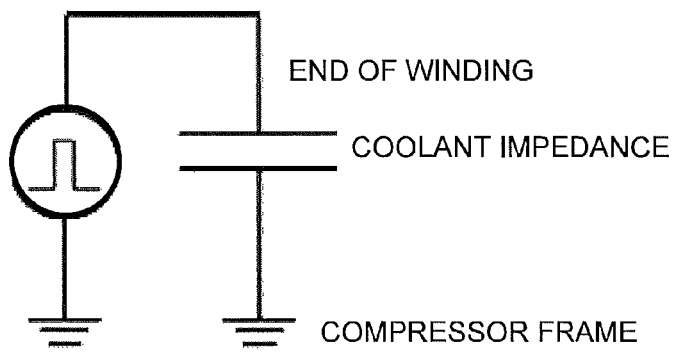
FIG. 7 is a diagram illustrating an equivalent circuit between the stator winding and a compressor frame.

As illustrated in FIG. 6, in the case of concentrated winding, a coil is concentratedly wound around each magnetic pole tooth. At that time, the wire at the start of winding is positioned on the inner side of the coil and the wire at the end of winding is positioned on the outer side of the coil. Meanwhile, as illustrated in FIG. 7, in between the end of coil winding and the compressor frame, there exists a coolant impedance. Thus, by connecting the end of coil winding to the neutral point side, the effect of coolant impedance on the phase voltage weakens. That makes it possible to supply a stable phase voltage and to reduce the noise or the vibrations.

Meanwhile, when the compressor has a scroll mechanism, high-pressure relief of the compressor room is difficult. Hence, if a liquid coolant enters therein, the compressor mechanism comes under excessive pressure and is at the risk of breakdown. In contrast, according to the first embodiment, efficient heating of the compressor room is possible thereby making it an effective measure against breakdown.

Thus, according to the first embodiment, a coolant can be preheated without causing vibrations or noise.

Second Embodiment.

In the first embodiment, only a high-frequency voltage is applied and there is no mention about the rotor of the motor 12. However, the rotor of the motor 12 can also be an interior permanent magnet type rotor.

In that case, since the rotor surface having a high-frequency magnetic flux linkage also serves as the heat generating portion, it becomes possible to achieve an increase in the coolant contact surface and achieve speedy heating for the compressor mechanism. That allows for efficient heating of the coolant. However, in contrast, due to the change in inductance caused by the rotor structure of an interior permanent magnet type synchronous electric motor, it is not possible to heat the liquid coolant in a stable manner.

In a second embodiment, a method is provided to solve that problem.

Figure 8:
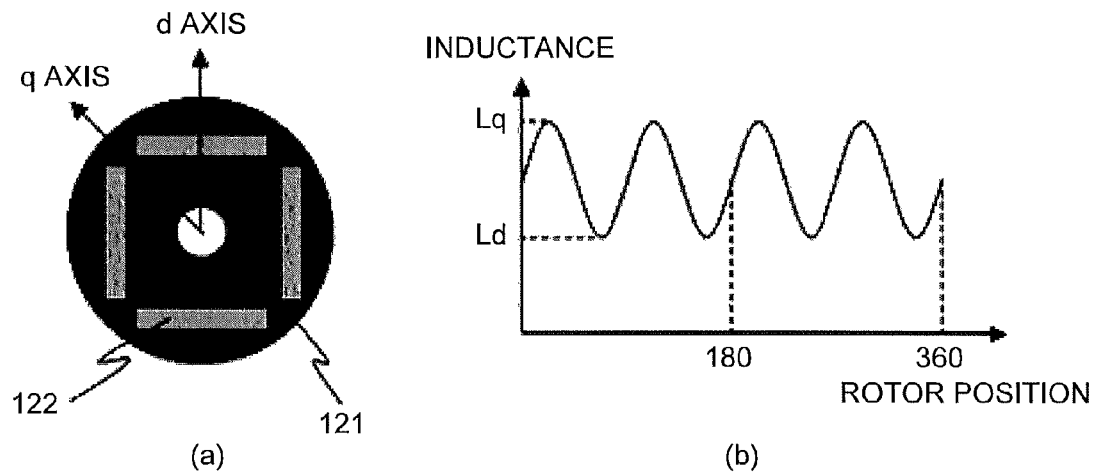
FIG. 8 is a diagram illustrating the rotor structure and the inductance in an interior permanent magnet type synchronous electric motor.

FIG. 8 is a diagram illustrating the rotor structure and illustrating the change in inductance in an interior permanent magnet type synchronous electric motor. In FIG. 8, the reference numeral 121 represents an iron core and the reference numeral 122 represents a magnet. In such a structure, the length of a void (a magnet portion) differs depending on the rotator position. Hence, the inductance from the stator's perspective changes as illustrated in (b). Thus, even if a high-frequency voltage of a predetermined frequency/predetermined voltage is applied by following the method according to the first embodiment, the rotor position influences a change in the current/power thereby making it difficult to heat the liquid coolant in a stable manner.

Figure 9:
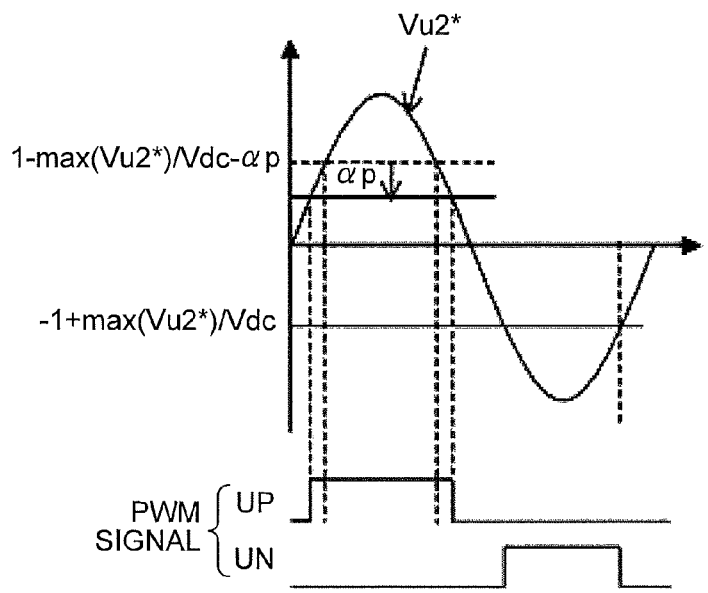
FIG. 9 is a diagram illustrating a signal generating method for a single phase as performed by a second PWM signal generating unit according to a second embodiment.

In FIG. 9 is illustrated an exemplary method for solving that issue.

FIG. 9 is a diagram illustrating a signal generating method for a single phase as performed by the second PWM signal generating unit according to the second embodiment. Herein, the difference from FIG. 3 is that a predetermined level, which corresponds to the modulation factor of the voltage command on the positive side of synchronous PWM waveform generation on the P-side, is lowered by a predetermined amount αp so that the output voltage of the phase is offset to the P-side. If this operation is performed for the three phases in an identical manner, then not only an alternating-current component but also a direct-current component gets superimposed on the output voltage waveform.

Due to the superimposed direct-current component, the rotor position gets fixed in a predetermined phase. Hence, it becomes possible to fix the rotor position at an intended value of inductance change as illustrated in FIG. 8(b). That makes it possible to stabilize the high-frequency impedance.

According to the second embodiment, coolant heating can be performed efficiently as well as the liquid coolant can be heated in a stable manner.

Third Embodiment.

In the embodiments described above, the explanation is given for a configuration for achieving the effect of high-frequency heating. However, during high-frequency heating, various problems come up such as an increase in the switching loss of the inverter or an increase in the noise represented by a noise terminal voltage.

In a third embodiment, an IGBT that is generally used as the switching element of the inverter is replaced with a MOSFET for the aim of reducing the inverter loss during high-frequency heating.

Figure 10:
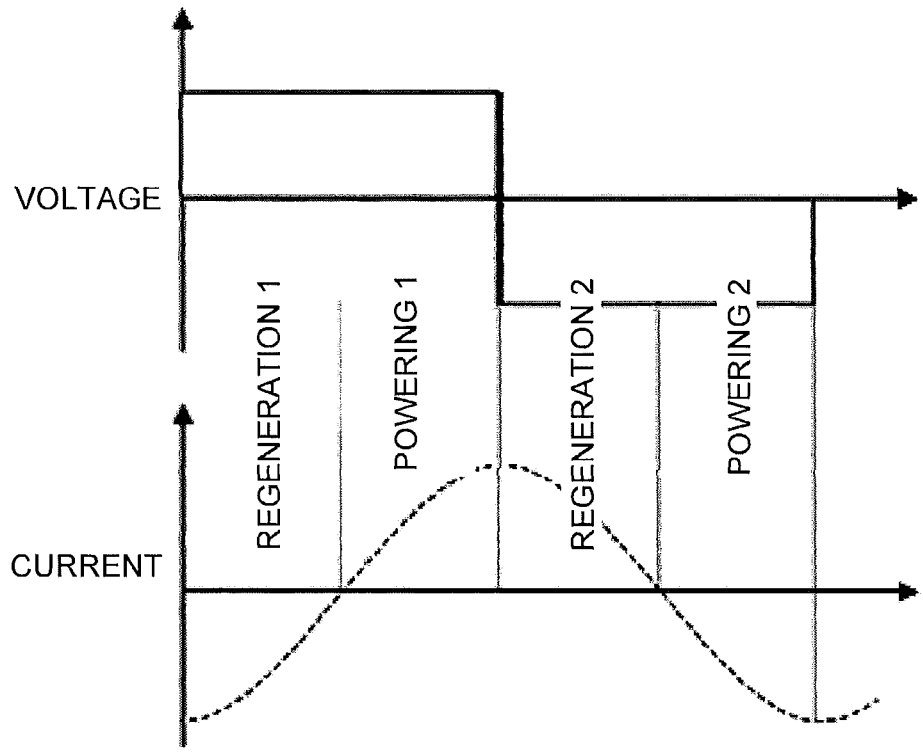
FIG. 10 is a diagram illustrating an inverter output voltage/current waveform during high-frequency heating.

FIG. 10 is a diagram illustrating an inverter output voltage/current waveform during high-frequency heating.

Since the motor winding during high-frequency heating almost completely becomes the inductance load, the current has a waveform delayed by almost 90° (phase factor zero) with respect to the voltage as illustrated in FIG. 10. The regenerative time ratio becomes almost 1/2, that is, increases extremely than that during the operation. Moreover, the motor winding has high impedance at high frequencies. Hence, as compared to when the motor is running, the current becomes sufficiently small. Besides, in the regenerative state, the upper arm element of the inverter is turned ON and the current flows to a diode that is connected in inverse-parallel manner to the switching element. Thus, if a switch element for which improvement of efficiency can be done during that time period is used, then it makes a significant contribution to the reduction of inverter loss during high-frequency heating.

Figure 11:
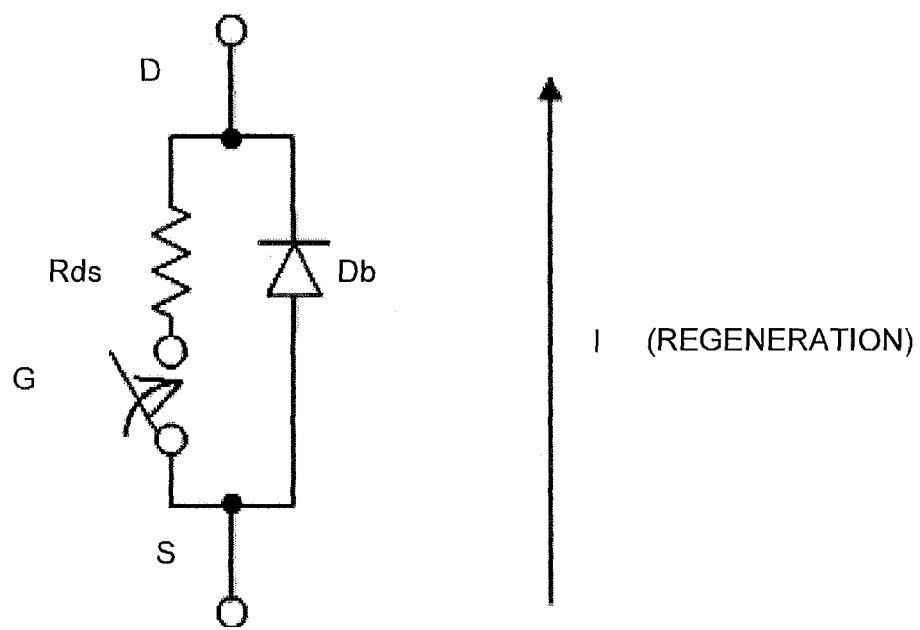
FIG. 11 is a diagram illustrating a model of principle of an MOSFET.

FIG. 11 is a diagram illustrating a model of principle of an MOSFET.

In FIG. 11; the terminal gate, the source, and the drain of the MOSFET are represented by G, S, and D, respectively. Moreover, Rds represents drain-to-source resistance when the switch is ON and Db represents a body diode.

In a regeneration state of a current-voltage waveform illustrated in FIG. 10, the gate condition of the element is ON and the current flows from the source toward the drain. In contrast, in the case of MOSFET, a current pathway is present not only on the diode side but also on the side of the main channel. Thus, for a low current, a synchronous rectification operation, in which the current passes through that resistance side at which the power loss is less, is performed.

Meanwhile, in an IGBT that is generally used as the inverter for a compressor, a plurality of regeneration current paths is not available. Hence, it is not possible to achieve improvement in efficiency.

Thus, according to the third embodiment, while performing high-frequency heating of a compressor motor, using a MOSFET as the switching element of the inverter enables achieving reduction in the switching loss.

Fourth Embodiment.

In a fourth embodiment, a wide band-gap semiconductor is used as the switching element of the inverter for the aim of reducing the noise during high-frequency heating.

Figure 12:
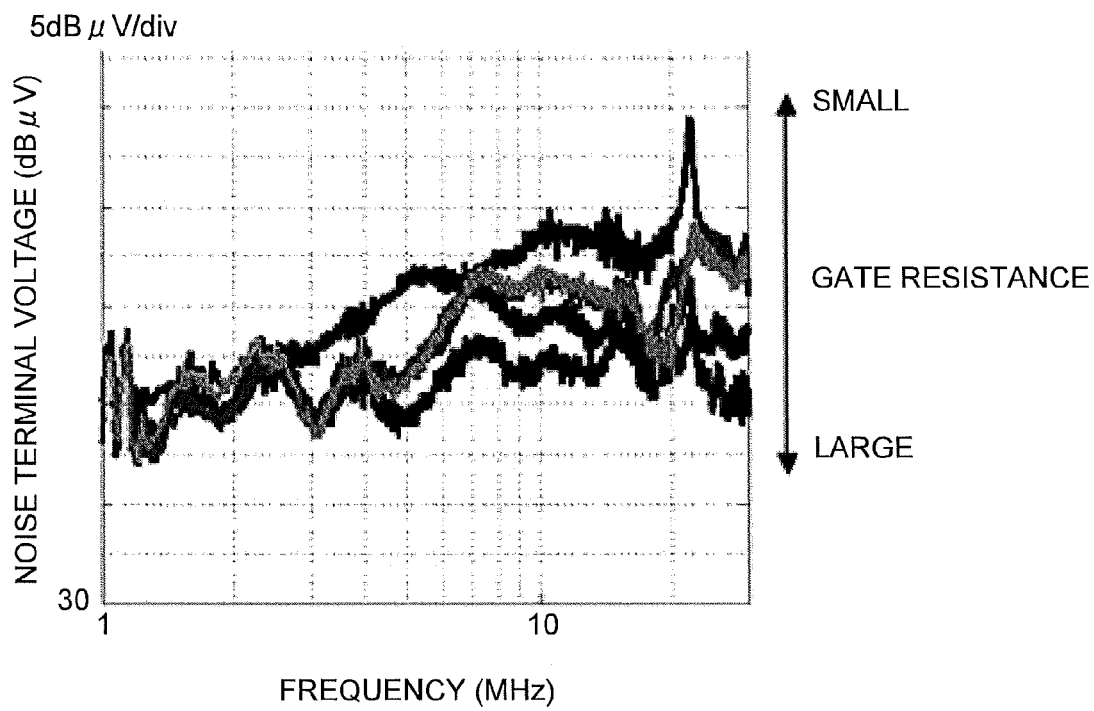
FIG. 12 is a diagram illustrating characteristics of the gate resistance of an element and characteristics of the noise terminal voltage of a circuit.

FIG. 12 is a diagram illustrating characteristics of the gate resistance of an element and characteristics of the noise terminal voltage of a circuit. As the applied voltage goes on becoming a high-frequency voltage, the gate resistance goes on to have a greater impact and it can be seen that the gate resistance needs to be increased in order to reduce the noise terminal voltage.

Generally, in the case of applying a high-frequency voltage to the motor using the inverter, there occurs noise that is caused by precipitous changes occurring in the circuit-to-earth voltage due to switching. That may have an adverse effect on the surrounding environment. In regard to that, usually, either the capacitance of a capacitor inserted in a common mode is increased or the switching speed of the switching element is adjusted with the gate resistance.

However, with an increase in the gate resistance, the switching loss also increases thereby resulting in a loss of the energy saving feature. Moreover, an increase in the capacitance of the capacitor leads to a rise in concerns about ground leakage/electrification that may occur due to an increase in a compressor leak current, that is, due to a common mode current of the compressor. Particularly, during the coolant liquefaction phenomenon, since the compressor is filled with the liquid coolant having a high electric permittivity, the common mode impedance decreases thereby leading to an increase in the leak current. In regard to that, in the fourth embodiment, a wide band-gap semiconductor is used as the switching element.

Figure 13:
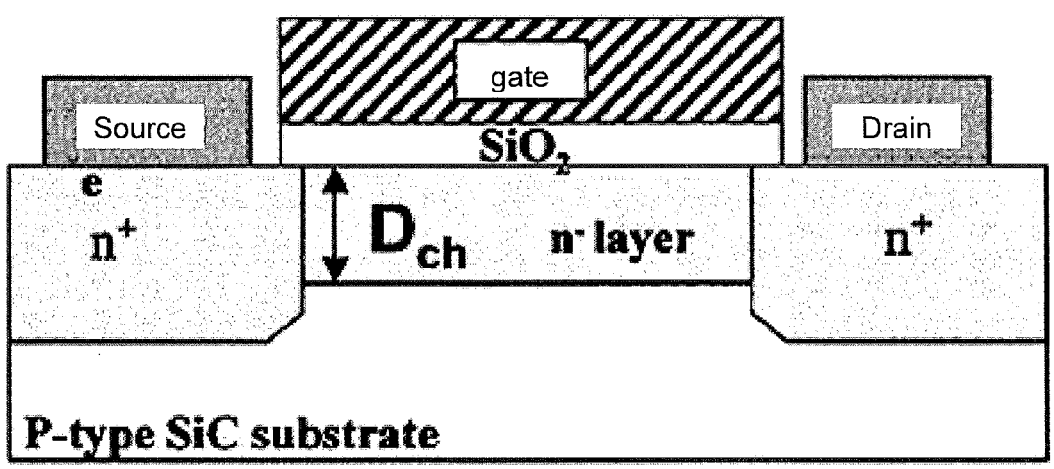
FIG. 13 is a diagram illustrating a structural example of a switching element in which an SiC is used.

FIG. 13 is a diagram illustrating a structural example of the switching element in which an SiC is used that is a representative example of the wide band-gap semiconductor. Generally, a wide band-gap semiconductor points to a semiconductor having a wider band-gap than silicon. Known examples of the wide band-gap semiconductor include SiC, diamond, GaN, etc. The wide band-gap semiconductor has the characteristics of having a high withstand voltage and being able to perform the switching operation in a speedy manner and at a low loss.

According to the fourth embodiment, even if the gate resistance is large, the switching loss is prevented from increasing thereby curbing the noise terminal voltage. In addition, if the capacitance of the common mode capacitor is reduced, the leak current of the compressor is also curbed.

Meanwhile, in combination with the first embodiment, if the switching frequency is reduced during the normal compressor operation, the switching loss can be reduced during the operation thereby making it possible to achieve more efficient operation. Moreover, if the element structure is MOSFET, it is also possible to simultaneously achieve the advantages of the third embodiment. Hence, it is needless to say that a more efficient and less noisy device can be achieved.

INDUSTRIAL APPLICABILITY

The present invention can be applied to, for example, the air-conditioning apparatus, refrigerators, freezing machines, or heat pump water heaters having refrigeration cycles in which an inverter compressor is used.

The invention claimed is:

1. An air-conditioning apparatus comprising:
   a coolant circuit configured by sequentially connecting a compressor, an indoor heat exchanger, an expansion valve, and an outdoor heat exchanger;
   a motor that operates a compressor mechanism disposed inside the compressor;
   an inverter for driving the motor; and
   a control unit that controls the inverter, wherein
   the control unit includes
      a liquefaction detecting unit that detects coolant liquefaction in the compressor;
      a first PWM signal generating unit that generates a carrier asynchronous pulse width modulation inverter control signal for driving the motor;

a second PWM signal generating unit that generates a carrier synchronous pulse width modulation inverter control signal for making the motor perform a preheating operation; and a switch that performs switching in such a way that either one of the first PWM signal generating unit or the second PWM signal generating unit outputs a corresponding inverter control signal to the inverter.

2. The air-conditioning apparatus according to claim 1, wherein, when the compressor has stopped operating and when the liquefaction detecting unit has detected coolant liquefaction, the switch selects the second PWM signal generating unit.

3. The air-conditioning apparatus according to claim 1, wherein a voltage output by the second PWM signal generating unit is output based on a magnitude relation between a direct-current voltage and an alternate-current voltage.

4. The air-conditioning apparatus according to claim 1, wherein the second PWM signal generating unit has a voltage command signal frequency of 10 kHz or more.

5. The air-conditioning apparatus according to claim 1, wherein a stator winding of the motor is concentrated winding.

6. The air-conditioning apparatus according to claim 5, wherein, as a stator winding direction of the motor, a phase terminal side is a starting point for winding and a neutral point side is an end point for winding.

7. The air-conditioning apparatus according to claim 1, wherein the rotor of the motor has an interior permanent magnet type structure.

8. The air-conditioning apparatus according to claim 7, wherein the second PWM signal generating unit outputs a voltage having a direct-current component superimposed thereon.

9. The air-conditioning apparatus according to claim 1, wherein
the inverter includes a switching element and the a switching element is a MOS-FET.

10. The air-conditioning apparatus according to claim 1, wherein
the inverter includes a switching element and the switching element is configured with a wide band-gap semiconductor.

11. The air-conditioning apparatus according to claim 10, wherein the wide band-gap semiconductor is configured from one of SiC, a GaN-based material, and diamond.

* * * * *